Aug. 23, 1927.

A. VALLAT 1,640,259

BOOTH GAME

Filed Dec. 16, 1926

A. Vallat, inventor

Aug. 23, 1927.

A. VALLAT

BOOTH GAME

Filed Dec. 16, 1926

A. Vallat
INVENTOR
By: Marks & Clerk
ATTYS.

Patented Aug. 23, 1927.

1,640,259

UNITED STATES PATENT OFFICE.

ANDRÉ VALLAT, OF PARIS, FRANCE, ASSIGNOR TO M. SOL LESSER, OF LOS ANGELES, CALIFORNIA.

BOOTH GAME.

Application filed December 16, 1926, Serial No. 155,251, and in France August 9, 1926.

My invention relates to a new game requiring skill chiefly for booths and places of amusement. In my new game, the players are each provided with a fishing-rod with which they try to catch facsimile fish moving in front of them. When a fish is caught and taken out by the player, an electric contact disposed in the fishing rod is closed by the weight of the fish and causes an intense light to be produced and simultaneously the shutter of a photographic apparatus directed towards the player to be opened whereby the latter is photographed whilst he is catching the fish. Of course the release of the shutter can be operated in any suitable manner.

The entire game is disposed within the interior of a shed which is decorated not only in front of the player, the same as in ordinary booths etc., but also on the inner surface of the counter or barrier over which the game is played so as to form, a setting when the player is photographed by the photographic apparatus.

My invention comprises a number of detail features namely:

1. The arrangement of the cabins containing the light producing apparatus and the photographic apparatuses.
2. The means for making the fish move in front of the players.
3. The electric device for supervising the game and controlling its duration.

A form of execution of my invention is shown by way of example, on appended drawings whereof—

Figure 1:
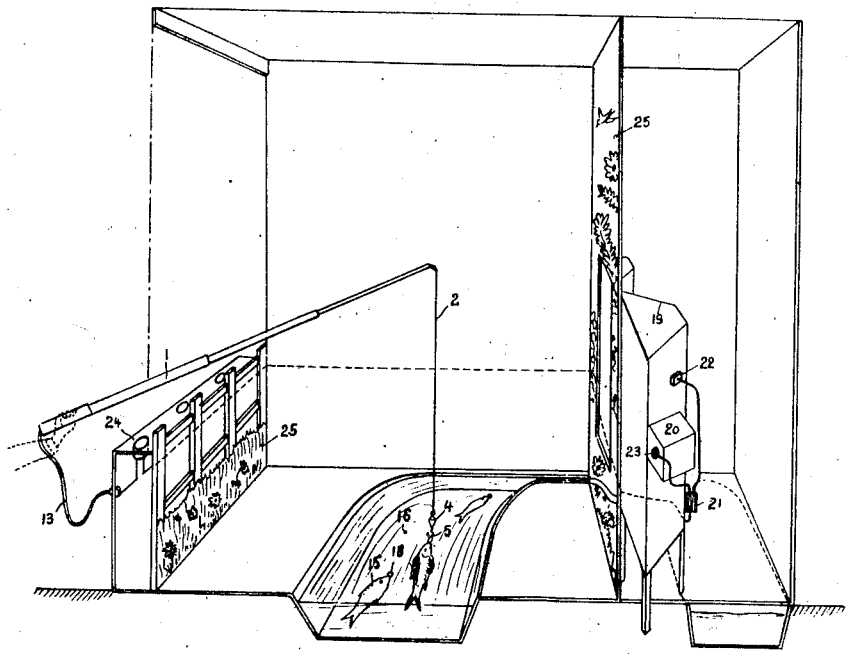
Fig. 1 is a perspective view partly sectional of a booth shed for my new game wherein the light producing and photographic apparatuses are disposed in parallel lines.
Figure 2:
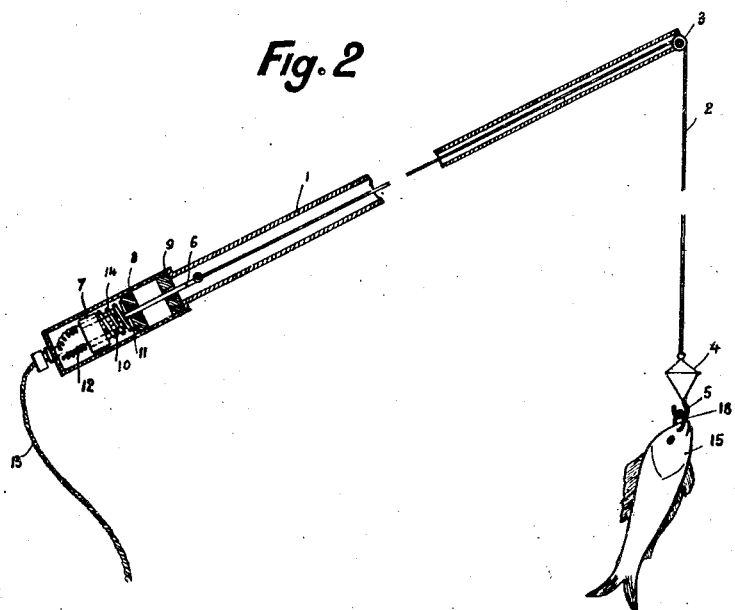
Fig. 2 shows a form of execution of the shutter releasing device.

Through a hollow fishing rod 1 (Figs. 1 and 2) held by the player is passed the line 2 passing over a small pulley 3 and bearing at its end an equilibrating weight replacing the cork and a hook 5 replacing the bait. The end of the line passing through the rod is secured to the stem 6 of the piston 7; this stem passes through the guiding plates 8 and 9. The piston 7 bears two contacting parts 10 adapted to be electrically connected by a small conducting plate 11 borne by the plate 8 on the side directed towards the said contacts. These contacts are connected with the electric circuit through two yielding connections 12 and a flexible wire 13 (Fig. 2). A spring 14 keeps normally the contacts 10 away from the small plate 11.

Figure 5:
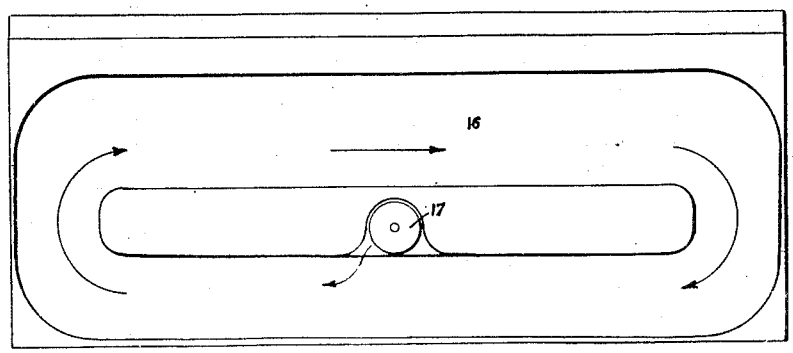
Fig. 5 is a plan view of the device forcing the water through its container in view of making the fish move.

Suitably weighted fish 15 of wood or celluloid are disposed in a pond or river 16 of proper shape wherein they are made to move by a current produced by a turbine 17 (Fig. 5) the axis of which may be inclined so as to form waves, by a paddle wheel or the like. These fish (mackerels, herrings, gurnets, comic subjects, lobsters, crabs, etc.) are provided with a ring 18 which can be caught by the hook 5 of the player's fishing-rod.

When a fish is caught and lifted, its suitably calculated weight draws the line 2, compresses the spring 14 and makes the piston 7 approach the stop 8 whereby the circuit is closed through the contacts 10 coming against the small plate 11.

In front of the player and of his rod is disposed a light producing cabin 10 wherein flash-powder is made to explode or containing any other suitable source of light. Next to the cabin 19 is disposed a photographic apparatus 20.

Figure 3:
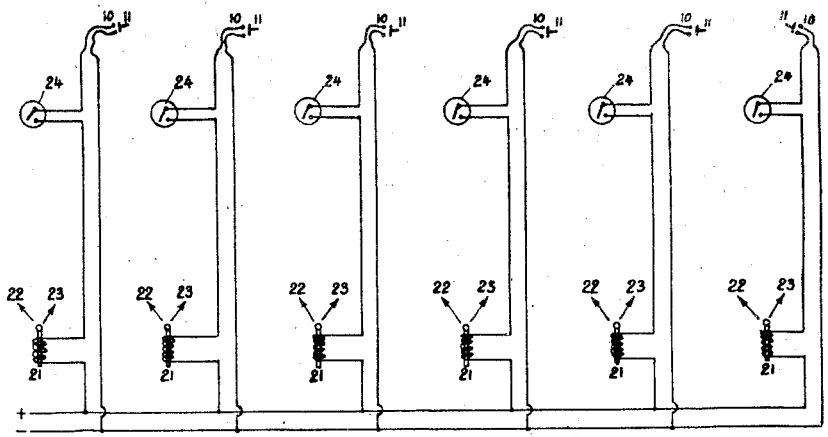
Fig. 3 is a diagram of the electric connections.

As soon as the circuit is closed at 10—11 the current flows through an electromagnet 21 (Fig. 3) which controls simultaneously with a suitable delay the magnesium igniter 22 and the shutter 23 of the photographic apparatus. The skillful player who catches a fish is thus immediately photographed.

A clockwork 24 comprising a lamp or a bell is inserted in series in the electric circuit and allows the duration of the game to be exactly timed. It closes a contact when the game begins and opens it automatically when the time allowed for the game is passed by. This clockwork is set going either manually by the owner of the game or automatically by insertion of a coin or the like into a suitable device.

Figure 4:
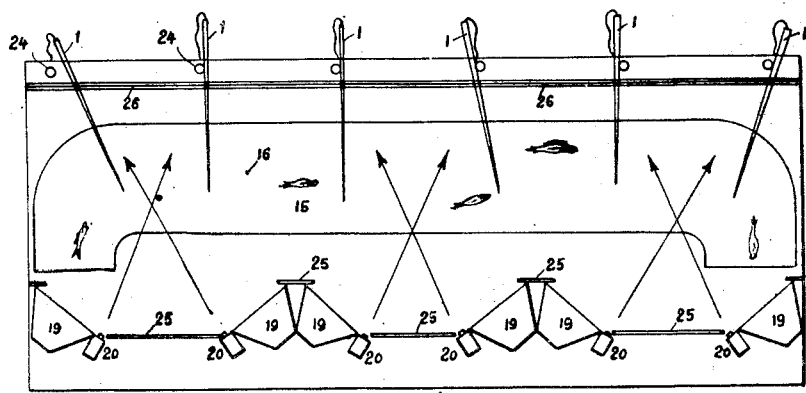
Fig. 4 is a general plan view of the game, the photographic apparatuses being disposed obliquely with reference to the players.

The illuminating and photographic apparatuses are preferably placed obliquely with reference to the players as shown on Fig. 4 whereby the latter can be photographed from three quarters and the distance between the apparatus and the player is great enough without the shed being very wide. Moreover this allows a greater number of apparatuses to be disposed in a shed of a given size and the said apparatuses to be more easily hidden by a scenery 25 (Fig. 1).

The arrangement shows moreover as stated not only a rear scenery but also a front scenery 25 whereby an artistic appearance is given to the photographs obtained.

The form of execution shown is given solely by way of example and the game can be executed in any other manner and with a very different combination of parts. Thus for instance the line instead of passing through the rod and of actuating a sliding contact by drawing it along can be disposed laterally like those used for pike fishing and be wound over a drum wherein is disposed an oscillating contact which closes as soon as the line is drawn whereby the drum is a little rotated. The fish instead of floating in a moving liquid may be disposed between rows of scenery showing water and water weeds, the fish being carried in baskets or the like disposed on a shaft provided with eccentric cams or cranks so as to make the heads of the fish periodically appear and disappear. In this form of execution wherein the water is suppressed, the scenery is disposed on both sides of the fish so as to give a pleasing appearance to the photograph obtained. The fish can also be disposed on a conveyor whereon they are secured by yielding jaws which release the fish as soon as they are caught. The shed instead of being rectangular can be circular, the photographic apparatuses being directed radially around the centre and the artificial river appearing as a circular ring. Also in a rectangular shed the water can be disposed in a pond divided by a longitudinal partition open only at the two ends. The players can thus try to catch the fish moving in both directions.

The essential novel feature of my invention which is the closing of an electric circuit by a contact placed on a fishing rod when a heavy movable fish is hooked on to the rod can be used also in lotteries for starting a bell, a siren or for lighting a lamp so as to announce a winner.

The circuits of each apparatus mounted in parallel and the motor actuating the turbine can be fed either with A. C. or D. C. by any electric generator or from the mains.

What I claim is:

1. A booth game comprising a fishing-rod, a line secured to the fishing rod, a hook at the outer end of the line, an electric circuit, a number of objects adapted to move in front of the hook, a ring borne by each object and adapted to engage said hook, a switch in said circuit borne by the rod and adapted to close when one of the said objects is hung on the hook, a spring urging the switch into its circuit breaking position, a photographic apparatus disposed in front of the rod and the shutter of said apparatus adapted to be opened when the circuit is operative.

2. A booth game comprising a fishing-rod, a line secured to the fishing-rod, a hook at the outer end of the line, an electric circuit, a number of objects adapted to move in front of the hook, a ring borne by each object and adapted to engage said hook, a switch in said circuit borne by the rod and adapted to close when one of the said objects is hung on the hook, a spring urging the switch into its circuit breaking position, a source of intense light and a photographic apparatus disposed in front of the rod, the shutter of said apparatus and an electromagnet inserted in the circuit and adapted to release the shutter and to ignite the source of light when excited by the current.

3. A booth game comprising a fishing-rod, a line secured to the fishing rod, a hook at the outer end of the line, an electric circuit, a number of objects adapted to move in front of the hook, a ring borne by each object and adapted to engage said hook, a switch in said circuit borne by the rod and adapted to close when one of the said objects is hung on the hook, a spring urging the switch into its circuit breaking position, a photographic apparatus disposed in front of the rod and the shutter of said apparatus adapted to be opened when the circuit is operative, and a clockwork adapted to break the circuit a predetermined time after the beginning of the game.

4. A booth game comprising a number of fishing rods disposed side by side, a line secured to each fishing rod, a hook at the outer end of each line, an electric circuit for each rod, a number of fish adapted to move in front of the hooks, a ring borne by each fish and adapted to engage said hooks, a switch in each circuit borne by the corresponding rod and adapted to close when one of the said fish is hung on the hook, a spring urging each switch into its circuit breaking position, a photographic apparatus disposed in front of each rod and the shutter of each apparatus adapted to be opened when the corresponding circuit is operative.

5. A booth game comprising a number of fishing rods disposed side by side, a line secured to each rod, a hook at the outer end of each line, an electric circuit for each rod, a number of objects adapted to move in front of the hooks, a ring borne by each object and adapted to engage said hooks, a switch in each said circuit borne by the rod and adapted to close when one of the objects is hung on the hook, a spring urging each switch in its circuit breaking position, photographic apparatuses disposed in front of and obliquely with reference to the corresponding rod, a shutter for each apparatus, a source of intense light for each rod, an electromagnet in each circuit adapted to release the shutter and to ignite the source of light when excited by the current, a scenery hiding the apparatuses and the sources of light and a scenery on the opposite side of the rods with reference to the apparatuses.

6. A booth game comprising a number of fishing rods disposed side by side, a line secured to each rod, a hook at the outer end of each line, an electric circuit for each rod, a number of fish, an annular pond in front of the rods, water in said pond, wherein the fish are adapted to float, a device for setting the water and the fish contained therein in motion, a ring borne by each fish and adapted to engage said hooks, a switch in each said circuit borne by the rod and adapted to close when one of the fish is hung on the hook, a spring urging each switch in its circuit breaking position, photographic apparatuses disposed in front of and obliquely with reference to the corresponding rod, a shutter for each apparatus, a source of intense light for each rod, an electromagnet in each circuit adapted to release the shutter and to ignite the source of light when excited by the current, a scenery hiding the apparatuses and the sources of light and a scenery on the opposite side of the rods with reference to the apparatuses.

In testimony whereof I have affixed my signature.

ANDRÉ VALLAT.